(12) United States Patent
Chang et al.

(10) Patent No.: US 8,423,653 B2
(45) Date of Patent: Apr. 16, 2013

(54) INTER-LAYER PARAMETER LIAISON SYSTEMS AND METHODS

(75) Inventors: Patricia R. Chang, San Ramon, CA (US); William Chung King, Lafayette, CA (US); Phillip A. Ritter, Danville, CA (US); Imtiaz Shaikh, Pleasant Hill, CA (US); Mingxing Li, San Jose, CA (US); Xuming Chen, San Ramon, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 587 days.

(21) Appl. No.: 12/416,132

(22) Filed: Mar. 31, 2009

(65) Prior Publication Data

US 2010/0250414 A1 Sep. 30, 2010

(51) Int. Cl.
*G06F 15/16* (2006.01)

(52) U.S. Cl.
USPC ............ 709/228; 709/202; 705/300; 719/328

(58) Field of Classification Search .................. 709/202, 709/228; 705/300
See application file for complete search history.

(56) References Cited

U.S. PATENT DOCUMENTS

| | | | | |
|---|---|---|---|---|
| 5,790,553 A * | 8/1998 | Deaton et al. | ............ | 370/466 |
| 6,246,678 B1 * | 6/2001 | Erb et al. | ............ | 370/352 |
| 6,823,373 B1 * | 11/2004 | Pancha et al. | ............ | 709/219 |
| 6,836,797 B2 * | 12/2004 | Givoly et al. | ............ | 709/223 |
| 6,957,255 B1 * | 10/2005 | Schweitzer et al. | ............ | 709/223 |
| 6,990,086 B1 * | 1/2006 | Holur et al. | ............ | 370/329 |
| 7,193,968 B1 * | 3/2007 | Kapoor et al. | ............ | 370/235 |
| 7,471,781 B2 * | 12/2008 | Bingaman et al. | ........ | 379/114.22 |
| 7,516,141 B2 * | 4/2009 | Ruan et al. | ............ | 1/1 |
| 7,609,652 B2 * | 10/2009 | Kellerer et al. | ............ | 370/252 |
| 7,656,815 B2 * | 2/2010 | Kellerer et al. | ............ | 370/252 |
| 7,991,385 B1 * | 8/2011 | Rosenberg et al. | ............ | 455/406 |
| 2003/0028495 A1 * | 2/2003 | Pallante | ............ | 705/78 |
| 2003/0061068 A1 * | 3/2003 | Curtis | ............ | 705/1 |
| 2009/0132401 A1 * | 5/2009 | Batz et al. | ............ | 705/34 |
| 2010/0250414 A1 * | 9/2010 | Chang et al. | ............ | 705/34 |

* cited by examiner

*Primary Examiner* — Michael Won

(57) ABSTRACT

An exemplary method includes generating an access record associated with a data session provided by at least one access layer element over an access network, generating an application record associated with an application provided by at least one application layer element over the access network, transmitting data representative of a correlation parameter associated with application from the at least one application layer element to the at least one access layer element via an inter-layer liaison subsystem, and inserting the correlation parameter associated with application and received from the at least one application layer element via the inter-layer liaison subsystem in the access record. In some examples, the method further includes correlating the access record and the application record based on the correlation parameter associated with the application. Other exemplary inter-layer parameter liaison methods and systems are also disclosed.

25 Claims, 11 Drawing Sheets

INTER-LAYER PARAMETER LIAISON SYSTEMS AND METHODS

BACKGROUND INFORMATION

Access networks provide many people and organizations with access to a variety of applications. For example, with the proliferation of wireless communication networks such as mobile telephone networks, access to mobile communication applications (e.g., voice communication, e-mail, and messaging applications) and other applications has become widely available.

Providers of access networks and applications made available over the access networks often charge for use of the access networks and applications. Unfortunately, certain conventional access networks do not have adequate technical capabilities to support all pricing structures that may be desirable to a provider. For example, with a conventional access network, separate billing records may be generated for each connection to the network and for each application accessed via the access network. A billing department may be forced to use a complicated and/or labor intensive process to attempt to link related billing records together to generate a bill in accordance with a provider pricing structure. In some cases, because of the complicated nature of this task and/or of a pricing structure, the billing department may not be able to generate a bill that accounts for all chargeable usage of the access network and/or for one or more applications accessed via the access network.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Exemplary inter-layer parameter liaison systems and methods are described herein. As described below, the exemplary systems and methods may facilitate transmitting of one or more correlation parameters across distinct layers of a multi-layer access network architecture via an inter-layer liaison subsystem. As used herein, a "correlation parameter" may include any parameter specific to a layer and that may be transmitted to another layer via the inter-layer liaison subsystem. Examples of correlation parameters are described further below.

Transmission of a correlation parameter across layers via the inter-layer liaison subsystem may facilitate one or more operations. As an example, a correlation parameter received from a layer may be used in one or more operations (e.g., location-based operations, billing operations, layer-specific operations, etc.) performed at another layer. As another example, transmission of a correlation parameter across layers via the inter-layer liaison subsystem may facilitate one or more correlation operations, such as correlation of layer-specific records associated with one or more services, data, and applications provided over distinct layers of an access network. Correlated records may be used in one or more operations such as one or more billing operations (e.g., generating a bill for one or more services, data, and applications provided over distinct layers of an access network). Examples of operations that may utilize one or more correlation parameters are described in more detail further below.

Exemplary embodiments of inter-layer parameter liaison systems and methods will now be described in more detail with reference to the accompanying drawings.

Figure 1:
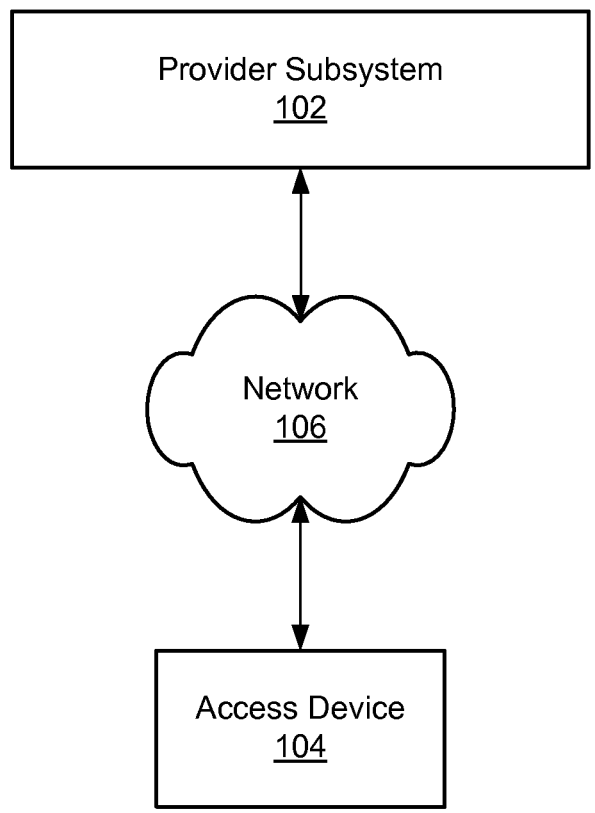
FIG. 1 illustrates an exemplary access network system.

FIG. 1 illustrates an exemplary access network system 100 (or simply "system 100"). As shown in FIG. 1, system 100 may include a provider subsystem 102 and an access device 104 communicatively connected to one another by way of a network 106.

Access device 104 may be associated with a user, who may utilize access device 104 to access one or more applications, data, and/or services made available by provider subsystem 102 over network 106. Access device 104 may include any device capable of communicating with provider subsystem 102 and/or accessing applications, data, and/or services made available by provider subsystem 102 over network 106. Access device 104 may include, but is not limited to, a computing device, a communication device (e.g., a telephone), a wireless computing device, a wireless communication device (e.g., a mobile telephone), a personal digital assistant, a vehicular computing and/or communication device, a navigation device, a set-top box, a media content processing device, a gaming device, and any other device configured to access one or more applications, data, and/or services made available by provider subsystem 102 over network 106.

Access device 104 and provider subsystem 102 may communicate over network 106 using any communication platforms and technologies suitable for transporting data and/or communication signals, including known communication technologies, devices, media, and protocols supportive of remote data communications, examples of which include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies (e.g., Long Term Evolution ("LTE")), Code Division Multiple Access ("CDMA") technologies, Evolution Data Optimized Protocol ("EVDO") (e.g., "1xEVDO"), Time Division Multiple Access ("TDMA") technologies, Short Message Service ("SMS"), Multimedia Message Service ("MMS"), radio frequency ("RF") signaling technologies, radio transmission technologies (e.g., One Times Radio Transmission Technology ("1×RTT")), wireless communication technologies (e.g., Bluetooth, Wi-Fi, etc.), in-band and out-of-band signaling technologies, optical signaling technologies, and other suitable communications technologies.

Network 106 may include one or more networks, including, but not limited to, access networks, wireless networks, mobile telephone networks (e.g., cellular telephone networks), closed media networks, open media networks, subscriber television networks, closed communication networks, open communication networks, satellite networks, navigation networks, optical fiber networks (e.g., fiber-to-the-premises ("FTTP") networks), broadband networks, narrowband networks, voice communications networks (e.g., VoIP networks), Public Switched Telephone Networks, the Internet, wide area networks, local area networks, public networks, private networks, and any other networks capable of carrying data and/or communications signals between access device 104 and provider subsystem 102. Communications between provider subsystem 102 and access device 104 may be transported using any one of above-listed networks, or any combination or sub-combination of the above-listed networks.

Multiple layers are typically used to support communications, applications, data, and services provided over network 106. For example, provider subsystem 102 and network 106 may be configured to provide network-based communications, applications, data, and services based on a layered communications and network protocol design, such as an Open Systems Interconnection ("OSI") reference model (or simply "OSI model"). The OSI model defines seven hierarchical layers—a physical layer, a data link layer, a network layer, a transport layer, a session layer, a presentation layer, and an application layer. Each layer may include a collection of conceptually similar functions and computing hardware and/or instructions (e.g., software) configured to perform the functions. The layers may be hierarchical such that one layer may receive data and/or services from an underlying layer and provide data and/or services to a higher layer. For example, a layer may provide a communication path that may be used by an application associated with a higher layer. The OSI model illustrates one example of a multi-layer architecture that may be used to support communications, applications, data, and services provided over network 106. Any other suitable multi-layer architecture may be used in other examples to support communications, applications, data, and services provided over network 106.

One drawback to a multi-layer architecture may be disconnects between layers. While the layers may be hierarchical in nature and may utilize data and or services provided by other layers, certain functions associated with specific layers may be separate and independent of certain functions associated with other layers.

Figure 2:
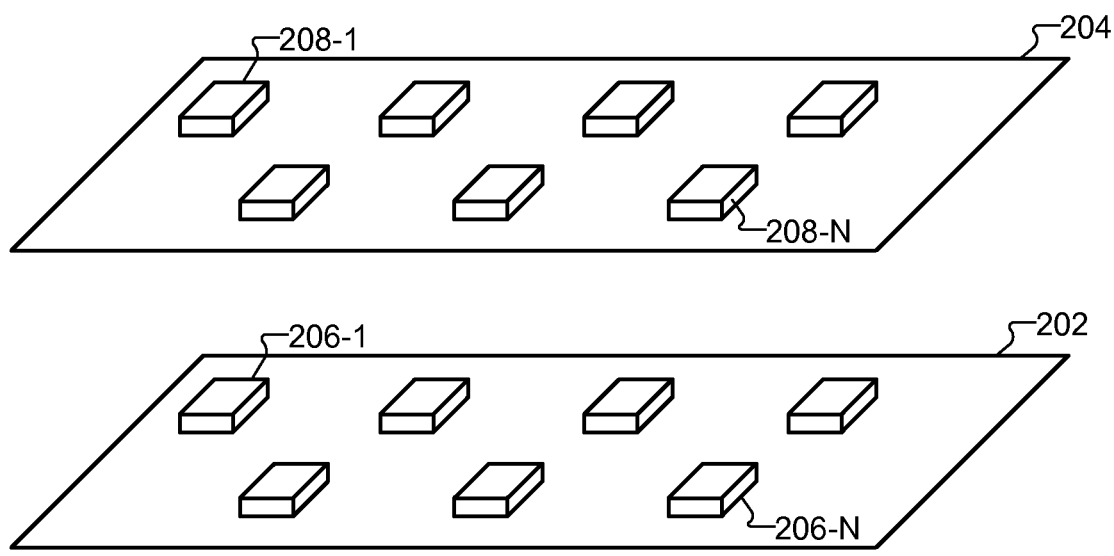
FIG. 2 illustrates exemplary layers of a multi-layer access network architecture.

FIG. 2 illustrates exemplary layers that may be used by provider subsystem 102 and/or network 106 to provide communications, applications, data, and/or services over network 106. FIG. 2 illustrates two separate layers, namely an access layer 202 and an application layer 204. This is illustrative only. The description of FIG. 2 may apply to additional layers and/or any other layers of a multi-layer network architecture used to support communications, applications, data, and/or services provided over network 106.

As shown in FIG. 2, access layer 202 may include one or more access layer elements 206 (e.g., access layer elements 206-1 through 206-N) and application layer 204 may include one or more application layer elements 208 (e.g., application layer elements 208-1 through 208-N). An access layer element 206 may include computing hardware and/or instructions (e.g., software) configured to provide one or more functions specific to access layer 202. An application layer element 208 may include computing hardware and/or instructions (e.g., software) configured to provide one or more functions specific to application layer 204.

As described further below, there may be an inherent disconnect between one or more functions associated with application layer 204 and one or more functions associated with access layer 202. For example, billing record functions may be separate and independent within each of the layers 204 and 206. However, provider subsystem 102 may be configured to correlate inter-layer functions and/or data, including correlating functions and/or data between access layer 202 and application layer 204.

Figure 3:
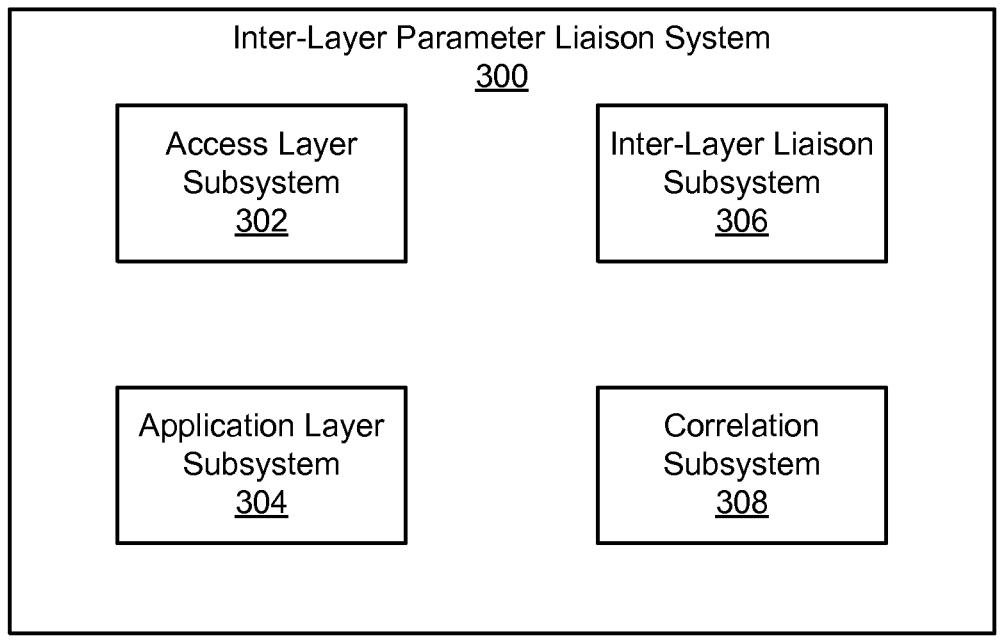
FIG. 3 illustrates an exemplary inter-layer parameter liaison system.

To illustrate, FIG. 3 is a block diagram of an exemplary inter-layer parameter liaison system 300 (or simply "system 300"). As shown in FIG. 3, system 300 may include an access layer subsystem 302, application layer subsystem 304, inter-layer liaison subsystem 306, and correlation subsystem 308.

Subsystems 302, 304, 306, and 308 may include or be implemented on one of more computing devices, including one or more computing devices within provider subsystem 102 and/or network 106. For example, one or more of the subsystems 302, 304, 306, and 308 may include or be implemented on one or more of the access layer elements 206 and/or application layer elements 208 shown in FIG. 2. In certain embodiments, inter-layer liaison subsystem 306 may be implemented on a network device, such as a policy server or a device including a database of subscriber information (e.g., a home location register), configured to communicate with one or more access layer elements 206 and one or more application layer elements.

Exemplary components and functions of each of the subsystems 302, 304, 306, and 308 will now be described.

Figure 4:
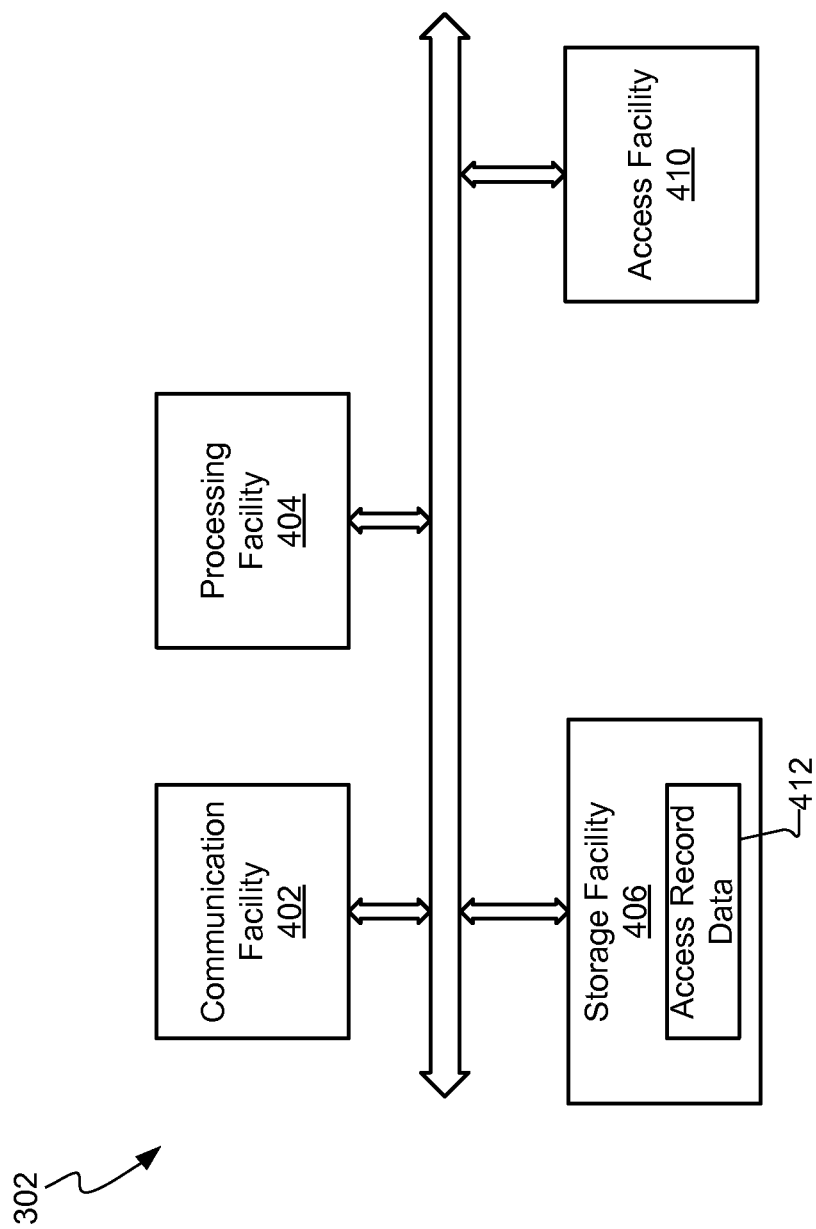
FIG. 4 illustrates an exemplary access layer subsystem.

FIG. 4 illustrates exemplary components of access layer subsystem 302. As shown in FIG. 4, access layer subsystem 302 may include a communication facility 402, processing facility 404, storage facility 406, and access facility 410 communicatively connected to one another. The facilities 402-410 may be communicatively connected using any suitable technologies. Each of the facilities 402-410 may be implemented as hardware, computing instructions (e.g., software) tangibly embodied on a computer-readable medium, or a combination of hardware and computing instructions configured to perform one or more of the access layer subsystem operations described herein.

Communication facility 402 may be configured to send and receive communications over network 106 (e.g., to/from access device 104) and/or to/from one or more other subsystems 304, 306, and 308. Communication facility 402 may include any device, logic, and/or other technologies suitable for transmitting and receiving data and other communications. In certain embodiments, communication facility 402 may be configured to support network access communications over network 106. Communication facility 402 may be configured to interface with any suitable communication media, protocols, formats, platforms, and networks, including any of those mentioned herein.

Processing facility 404 may be configured to control, execute, and/or direct execution of operations of one or more components of the access layer subsystem 302. Processing facility 404 may execute and/or direct execution of operations in accordance with computer-executable instructions such as may be stored in data storage facility 406 or other computer-readable medium. As an example, processing facility 404 may be configured to process communications, including demodulating, decoding, and parsing received communications, and encoding and modulating communications for transmission over network 106.

Data storage facility 406 may include one or more data storage media, devices, or configurations and may employ any type, form, and combination of computer-readable media. For example, the data storage facility 406 may include, but is not limited to, a hard drive, network drive, flash drive, magnetic disc, optical disc, random access memory ("RAM"), dynamic RAM ("DRAM"), other non-volatile and/or volatile storage unit, or a combination or sub-combination thereof. Data may be temporarily and/or permanently stored in the data storage facility 406.

Access facility 410 may be configured to provide access services over network 106. For example, access facility 410 may be configured to provide (e.g., establish, maintain, terminate, and tear down) a data session with access device 104 over network 106. As an example, access layer subsystem 302 may receive a request from access device 104 to establish a data session over network 106. Access facility 410 may control establishment of the requested data session with access device 104. A data session may comprise any suitable connection session facilitating communications between access device 104 and one or more elements of provider subsystem 102 over network 106.

A data session may be specific to a particular type of communication protocol or technology supported over network 106. For example, a data session may include, without limitation, an EVDO, LTE, 1×RTT, or subscriber television based connection session.

Access facility 410 may be further configured to maintain access record data 412 associated with data sessions. As shown in FIG. 4, access record data 412 may be stored in storage facility 406 of access layer subsystem 302. Access record data 412 may include one or more access records associated with one or more data sessions provided, or being provided, by access facility 410. For example, when a data session is established with access device 104, access facility 410 may generate an access record associated with the data session (i.e., a "data session access record"). The access facility 410 may update the contents of the data session access record based on events associated with the data session, such as data being transmitted via the data session and/or termination of the data session. Access facility 410 may maintain the contents of the data session access record in at least substantially real time.

A data session access record may include any information associated with a data session. For example, a data session access record may include, without limitation, information identifying an access layer element that established the data session, information identifying one or more access layer elements that participated in providing the data session (e.g., a network node identifier for an access layer element), timestamps for times at which the data session was started and/or stopped, information about the access device 104 associated with the data session (e.g., geographic location information such as a geographic area identifier indicating a geographic location of access device 104), information about origination and termination endpoint devices, information about the length of time that a data session is active (e.g., duration in seconds and/or minutes of usage), data throughput associated with the data session (e.g., kilobyte usage), information about data session type (e.g., information indicating an EVDO based data session), information delineating upstream and downstream data throughput via the data session, and any other information descriptive of or otherwise associated with the data session.

Access facility 410 may be configured to generate one or more correlation parameters associated with a data session (i.e., "data session correlation parameters"). As described herein, one or more data session correlation parameters may be used in one or more operations, such as operations correlating an access record associated with a data session with one or more related records associated with other layers (e.g., an application record associated with application layer 204).

A data session correlation parameter may include any data associated with a data session, including data that may be used to correlate an access record associated with the data session with one or more related records that are associated with other layers. For example, a data session correlation parameter may include a data session identifier and/or a data session access record identifier that may be used to identify the data session and/or the access record associated with the data session.

As another example, a data session correlation parameter may include a location parameter associated with a data session. The location parameter may include location information indicating one or more geographic locations, access layer elements 206, locations of access layer elements 206, and/or locations of access device 104 associated with the data session. For example, the location parameter may indicate a general geographic location of access device 104 when the data session is established, when the data session is terminated, when access to an application via the data session is initiated, and/or when access to an application via the data session is terminated. To this end, access facility 410 may be configured to determine one or more geographic locations, access layer elements 206, locations of access layer elements 206, and/or locations of access device 104 associated with the data session and/or applications accessed via the data session.

The above-described examples of correlation parameters associated with a data session are illustrative only. A data session correlation parameter may include any parameter associated with a data session and/or specific to access layer 202. In other embodiments, other data session correlation parameters may be generated and transmitted to one or more other layers via inter-layer liaison subsystem 306 for use in one or more operations (e.g., for use in operations performed by an application layer element 208 such as an application server or for use in correlating an access record associated with a data session.)

One or more data session correlation parameters may be included in an access record associated with a data session. In certain embodiments, for example, access facility 410 may be configured to insert a correlation parameter in a data session access record.

In certain examples, an access record associated with a data session may comprise a billing record associated with the data session (i.e., "data session billing record"). A data session billing record may include any of the access record information described above, as well as any other information about the data session that may be used for one or more billing operations. In certain examples, a correlation parameter associated with a data session, and which may be included in a data session billing record, may comprise a billing identifier associated with the data session (i.e., a "data session billing identifier").

Access layer subsystem 302 may be configured to transmit data representative of one or more correlation parameters associated with a data session to application layer subsystem 304 via inter-layer liaison subsystem 306 for use by application layer subsystem 304 in one or more application layer operations, including insertion of the correlation parameter(s) in one or more application records, as described further below.

In certain embodiments, access layer subsystem 302 may be further configured to provide data representative of a data session access record to correlation subsystem 308 for use in one or more correlation operations, as is also described further below. As is also described further below, access layer subsystem 302 may be configured to receive one or more correlation parameters associated with other layers (e.g., an application correlation parameter associated with application layer 204) and to use the received correlation parameter(s) in one or more access layer operations, including insertion of the received correlation parameter(s) in an access record associated with a data session for use in correlating the data session access record with one or more related records associated with the other layers.

Figure 5:
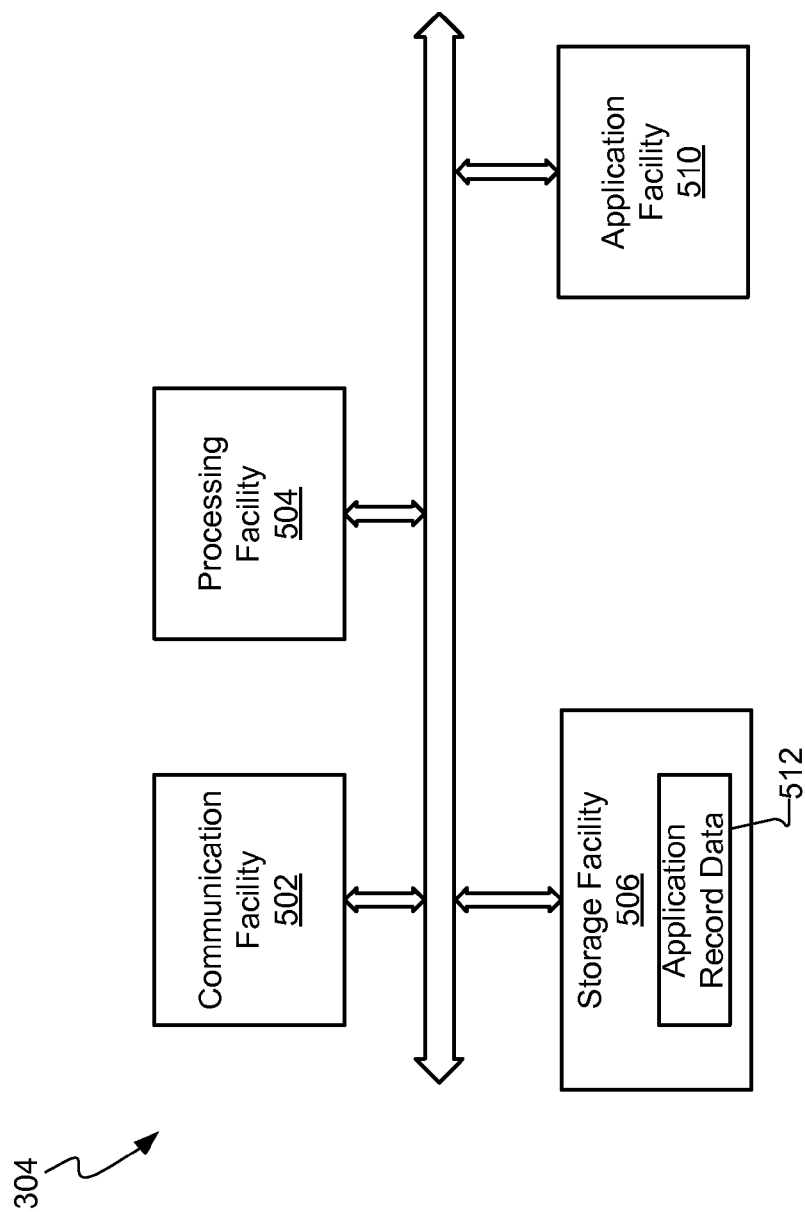
FIG. 5 illustrates an exemplary application layer subsystem.

FIG. 5 illustrates exemplary components of application layer subsystem 304. As shown in FIG. 5, application layer subsystem 304 may include a communication facility 502, processing facility 504, storage facility 506, and application facility 510 communicatively connected to one another. The facilities 502-510 may be communicatively connected using any suitable technologies. Each of the facilities 502-510 may be implemented as hardware, computing instructions (e.g., software) tangibly embodied on a computer-readable medium, or a combination of hardware and computing instructions configured to perform one or more of the application layer subsystem operations described herein.

Communication facility 502 may be configured to send and receive communications over network 106 and/or to/from one or more other subsystems 302, 306, and 308. Communication facility 502 may include any device, logic, and/or other technologies suitable for transmitting and receiving data and other communications. In certain embodiments, communication facility 502 may be configured to support application-related communications over network 106 (e.g., at application layer 204 of network 106). Communication facility 502 may be configured to interface with any suitable communication media, protocols, formats, platforms, and networks, including any of those mentioned herein.

Processing facility 504 may be configured to control, execute, and/or direct execution of operations of one or more components of the application layer subsystem 304. Processing facility 504 may execute and/or direct execution of operations in accordance with computer-executable instructions such as may be stored in data storage facility 506 or other computer-readable medium. As an example, processing facility 504 may be configured to process communications, including demodulating, decoding, and parsing received communications, and encoding and modulating communications for transmission over network 106.

Data storage facility 506 may include one or more data storage media, devices, or configurations and may employ any type, form, and combination of computer-readable media. For example, the data storage facility 506 may include, but is not limited to, a hard drive, network drive, flash drive, magnetic disc, optical disc, random application memory ("RAM"), dynamic RAM ("DRAM"), other non-volatile and/or volatile storage unit, or a combination or subcombination thereof. Data may be temporarily and/or permanently stored in the data storage facility 506.

Application facility 510 may be configured to provide one or more applications over network 106. As used herein, an "application" provided by application facility 510 of application layer subsystem 304 over network 106 may include any application executable, function, service, and/or data provided over network 106 (e.g., to access device 104 via network 106). Examples of such applications may include, but are not limited to, voice communication service applications (e.g., cellular telephone service applications and/or Voice over Internet Protocol ("VoIP") service applications), location-based service applications (e.g., global positioning system ("GPS") service applications), ringtone applications, text-messaging service applications (e.g., SMS), media-messaging service applications (e.g., MMS), e-mail service applications, chat service applications, video delivery applications, audio delivery applications, multimedia delivery applications, content download and/or streaming applications, conference call service applications, data upload and storage applications, and data access service applications (e.g., web-access service applications).

In certain examples, applications provided over network may be provided via a data session provided by access layer subsystem 302 as described above. For example, a data session between access device 104 and access layer subsystem 302 may be used to transport data associated with an application provided to the access device 104 by application layer subsystem 304. Hence, communications technologies used to establish the data session, such as EVDO, 1×RTT, and LTE, may be used to deliver data for applications provided by application layer subsystem 304 to access device 104 via the data session. Accordingly, a user of access device 104 (e.g., an end user such as a subscriber to one or more access services and/or applications) may obtain access to one or more applications provided by application layer subsystem 304 over network 106.

For example, access facility 410 may establish a data session with access device 104 over network 106 as described above. Access device 104 may then request an application be provided over the data session. Application facility 510 may receive the application request and provide the requested application to access device 104 via the data session.

Application facility 510 may be further configured to maintain application record data 512 associated with applications provided over network 106. As shown in FIG. 5, application record data 512 may be stored in storage facility 506 of application layer subsystem 304. Application record data 512 may include one or more application records associated with one or more applications provided, or being provided, by application facility 510. For example, when an application is provided to access device 104, application facility 510 may generate an application record associated with the application. The application facility 510 may update the contents of the application record based on events associated with the application, such as sending and/or receiving of application-related data by application facility 510. Application facility 510 may maintain the contents of the application record in at least substantially real time.

An application record may include any information associated with an application provided by application facility 510 over network 106. For example, an application record may include, without limitation, information identifying an application layer element that launched and/or executed the application, information identifying one or more application layer elements that participated in providing the application (e.g., a network node identifier for an application layer element), timestamps for times at which the application was started and/or stopped, information about the access device 104 associated with the application (e.g., IP address information for the access device 104 and/or geographic location information such as a geographic area identifier indicating a geographic location of access device 104), information about origination and termination endpoint elements and data counts, information about the length of time that an application is active (e.g., duration in seconds and/or minutes of usage), data throughput associated with the application (e.g., kilobyte usage), information delineating upstream and downstream data throughput related to the application, and any other information descriptive of or otherwise associated with the application.

Application facility 510 may be configured to generate one or more correlation parameters associated with an application (i.e., "application correlation parameters"). As described herein, one or more application correlation parameters may be used in one or more operations, such as operations correlating an application record associated with an application with one or more related records associated with other layers (e.g., a data session record associated with access layer 202).

An application correlation parameter may include any data associated with an application and/or specific to application layer 204, including data that may be used to correlate an application record associated with the application with one or more related records that are associated with other layers. For example, an application correlation parameter may include an application identifier and/or an application record identifier that may be used to identify the application and/or the application record associated with the application. These examples of correlation parameters associated with an application are illustrative only. In other embodiments, other application correlation parameters may be generated by application facility 510.

One or more application correlation parameters may be included in an application record associated with an application. In certain embodiments, for example, application facility 510 may be configured to insert an application correlation parameter in an application record.

In certain examples, an application record associated with an application may comprise a billing record associated with the application (i.e., an "application billing record"). An application billing record may include any of the application record information described above, as well as any other information about the application that may be used for one or more billing operations. In certain examples, a correlation parameter associated with an application, and which may be included in an application billing record, may comprise a billing identifier associated with the application (i.e., an "application billing identifier").

Application layer subsystem 304 may be configured to transmit data representative of one or more correlation parameters associated with an application to access layer subsystem 302 via inter-layer liaison subsystem 306 for use by access layer subsystem 302 in one or more access layer operations, including insertion of the correlation parameter(s) in one or more asset records, as described further below. Application layer subsystem 304 may be further configured to provide data representative of an application record to correlation subsystem 308 for use in one or more correlation operations, as is also described further below.

As is also described further below, in certain embodiments application layer subsystem 304 may be configured to receive one or more correlation parameters associated with other layers (e.g., a data session correlation parameter associated with access layer 202) and to use the received correlation parameter(s) in one or more application layer operations, including insertion of the received correlation parameter(s) in an application record associated with an application. Examples of other application layer operations are described further below. In certain embodiments, the correlation parameter(s) may be used to correlate the application record with one or more related records associated with the other layers and/or for other operations (e.g., generating a bill for usage of an application), as described further below.

Figure 6:
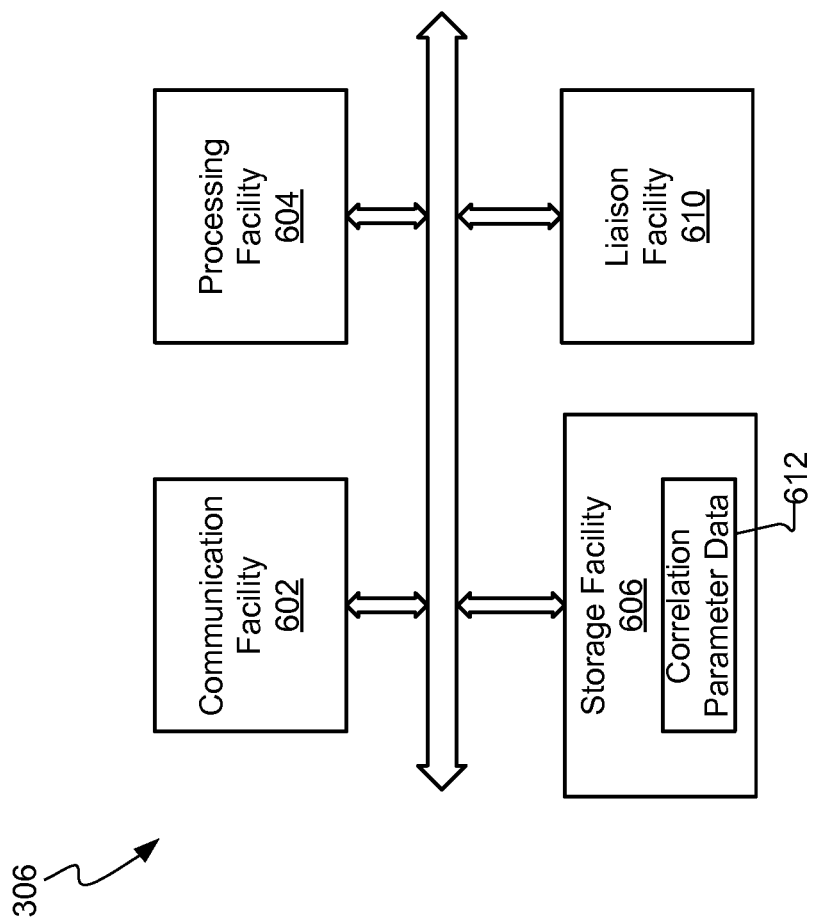
FIG. 6 illustrates an exemplary inter-layer liaison subsystem.

FIG. 6 illustrates exemplary components of inter-layer liaison subsystem 306. As shown in FIG. 6, inter-layer liaison subsystem 306 may include a communication facility 602, processing facility 604, storage facility 606, and liaison facility 610 communicatively connected to one another. The facilities 602-610 may be communicatively connected using any suitable technologies. Each of the facilities 602-610 may be implemented as hardware, computing instructions (e.g., software) tangibly embodied on a computer-readable medium, or a combination of hardware and computing instructions configured to perform one or more of the access layer subsystem operations described herein.

Communication facility 602 may be configured to send and receive communications over network 106 and/or to/from one or more other subsystems 302, 304, and 308. In particular, communication facility 602 may be configured to support communications with multiple layers of a multi-layer architecture, including with access layer subsystem 302 (e.g., with one or more access layer elements 206 of access layer 202) and with application layer subsystem 304 (e.g., with one or more application layer elements 208 of application layer 204). Communication facility 602 may include any device, logic, and/or other technologies suitable for transmitting and receiving data and other communications. Communication facility 602 may be configured to interface with any suitable communication media, protocols, formats, platforms, layers, and networks, including any of those mentioned herein.

Processing facility 604 may be configured to control, execute, and/or direct execution of operations of one or more components of the inter-layer liaison subsystem 306. Processing facility 604 may execute and/or direct execution of operations in accordance with computer-executable instructions such as may be stored in data storage facility 606 or other computer-readable medium. As an example, processing facility 604 may be configured to process communications, including demodulating, decoding, converting, and/or parsing received communications, and encoding, modulating, and/or converting communications for transmission over network 106 and/or for transmission to one or more layers of a multi-layer network architecture.

Data storage facility 606 may include one or more data storage media, devices, or configurations and may employ any type, form, and combination of computer-readable media. For example, the data storage facility 606 may include, but is not limited to, a hard drive, network drive, flash drive, magnetic disc, optical disc, random access memory ("RAM"), dynamic RAM ("DRAM"), other non-volatile and/or volatile storage unit, or a combination or sub-combination thereof. Data may be temporarily and/or permanently stored in the data storage facility 606.

Liaison facility 610 may be configured to function as an inter-layer parameter liaison. For instance, liaison facility 610 may be configured to acquire and forward one or more correlation parameters between various layers of a multi-layer network architecture. As an example, liaison facility 610 may acquire data representative of a correlation parameter from a particular layer (e.g., from a layer element of a first layer) and forward data representative of the acquired correlation parameter to another layer (e.g., to a layer element of a second layer). In certain embodiments, correlation parameters may be acquired and forwarded in at least substantially real time by liaison facility 610.

To illustrate acquisition and forwarding of a correlation parameter, inter-layer liaison subsystem 306 may acquire data representative of a correlation parameter associated with a data session from access layer subsystem 302 (e.g., from at least one access layer element 206). Inter-layer liaison subsystem 306 may then transmit (e.g., forward) data representative of the acquired correlation parameter associated with the data session to application layer subsystem 304 (e.g., to at least one application layer element 208). Application layer subsystem 304 may use the received correlation parameter in one or more application layer operations such as insertion of the correlation parameter associated with the data session in an application record associated with an application that is related to the data session (e.g., an application that is provided to access device 104 via the data session). The data session correlation parameter may include any of the parameters described above, including a data session identifier and/or location parameter, for example.

Additionally or alternatively, inter-layer liaison subsystem 306 may acquire data representative of a correlation parameter associated with an application from application layer subsystem 304 (e.g., from at least one application layer element 208). Inter-layer liaison subsystem 306 may then transmit (e.g., forward) data representative of the acquired correlation parameter associated with the application to access layer subsystem 302 (e.g., to at least one access layer element 206). Access layer subsystem 302 may use the received correlation parameter in one or more access layer operations such as insertion of the correlation parameter associated with the application in an access record associated with a data session that is related to the application (e.g., a data session that is used to deliver the application to access device 104). The application correlation parameter may include any of the parameters described above, including an application identifier, for example.

Liaison facility 610 may be further configured to maintain correlation parameter data 612 representative of one or more correlation parameters acquired and/or or transmitted by inter-layer liaison subsystem 306 as described above. As shown in FIG. 6, correlation parameter data 612 may be stored in storage facility 606 of inter-layer liaison subsystem 306. In certain embodiments, when a correlation parameter is acquired by inter-layer liaison subsystem 306, liaison facility 610 may store data representative of the correlation parameter in the correlation parameter data 612. In some examples, liaison facility 610 may maintain the contents of the correlation parameter data 612 in at least substantially real time. Inter-layer liaison subsystem 306 may provide correlation parameter data 612 to correlation subsystem 308 for use in correlating records, as described below.

By functioning as an inter-layer parameter liaison, liaison facility 610, and consequently inter-layer liaison subsystem 306, may be configured to bridge previous disconnects between certain functions associated with different layers of a multi-layer network architecture. Correlation parameters shared between multiple layers by inter-layer liaison subsystem 306 may be used for one or more purposes, including in one or more layer-specific operations, for automatically correlating related records (e.g., an access record and one or more related application records), and/or for one or more billing operations associated with access services and applications provided over network 106.

Examples of operations in which one or more correlation parameters that have been transmitted across layers via inter-layer liaison subsystem 306 may be used will now be described, including examples of using one or more correlation parameters in correlating operations and layer-specific operations (e.g., application-layer operations). These examples are illustrative only. Correlation parameters that have been transmitted across layers via inter-layer liaison subsystem 306 may be used in other operations in other embodiments.

Figure 7:
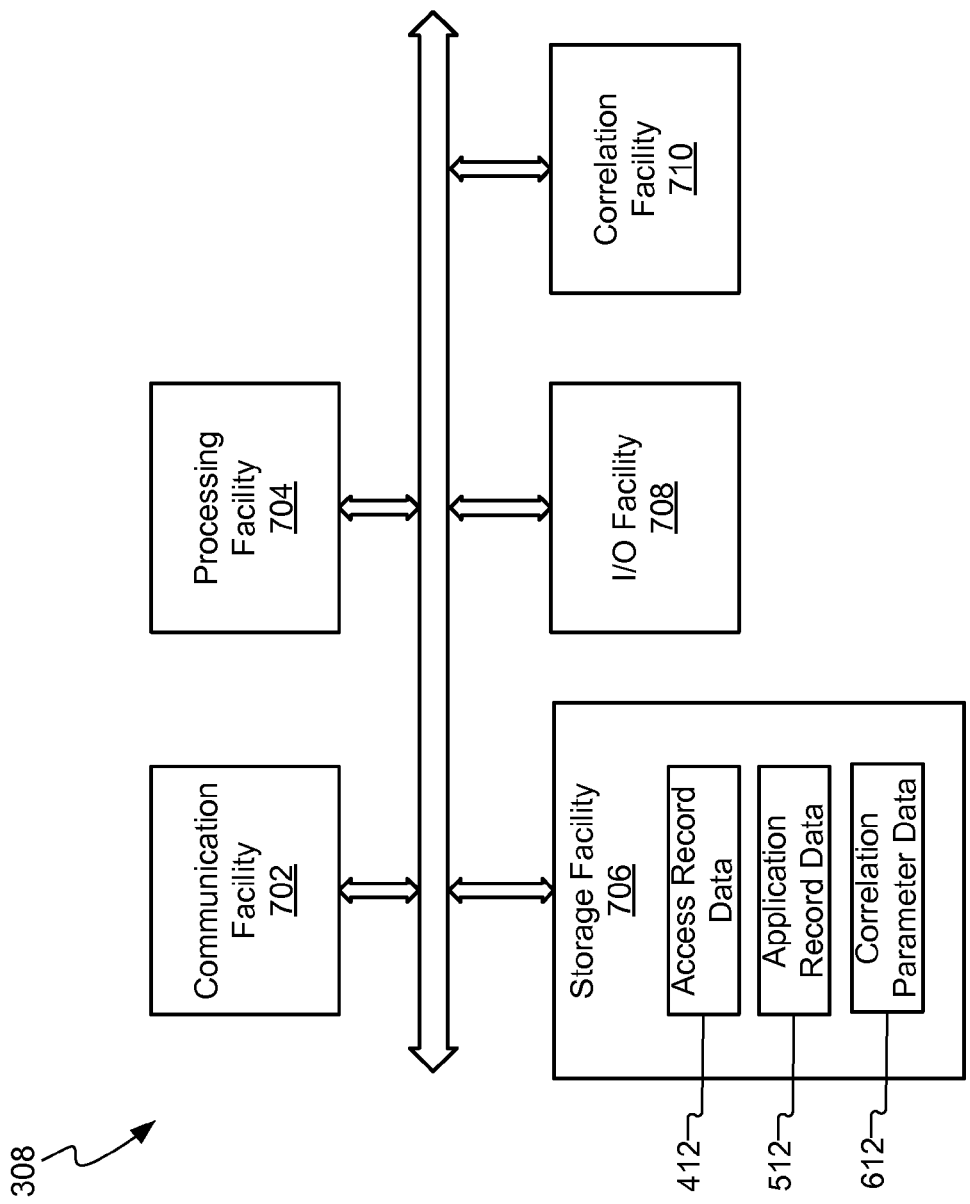
FIG. 7 illustrates an exemplary correlation subsystem.

To help illustrate an example of using one or more correlation parameters to correlate records across layers, FIG. 7 illustrates exemplary components of correlation subsystem 308. As shown in FIG. 7, correlation subsystem 308 may include a communication facility 702, processing facility 704, storage facility 706, input/output ("I/O") facility 708, and correlation facility 710 communicatively connected to one another. The facilities 702-710 may be communicatively connected using any suitable technologies. Each of the facilities 702-710 may be implemented as hardware, computing instructions (e.g., software) tangibly embodied on a computer-readable medium, or a combination of hardware and computing instructions configured to perform one or more of the access layer subsystem operations described herein.

Communication facility 702 may be configured to send and receive communications over network 106 and/or to/from one or more other subsystems 302, 304, and 306. In particular, communication facility 602 may be configured to receive data representative of access records and application records from access layer subsystem 302 and application layer subsystem 304, respectively. Communication facility 702 may include any device, logic, and/or other technologies suitable for transmitting and receiving data and other communications. Communication facility 702 may be configured to interface with any suitable communication media, protocols, formats, platforms, layers, and networks, including any of those mentioned herein.

Processing facility 704 may be configured to control, execute, and/or direct execution of operations of one or more components of correlation subsystem 308. Processing facility 704 may execute and/or direct execution of operations in accordance with computer-executable instructions such as may be stored in data storage facility 706 or other computer-readable medium.

Data storage facility 706 may include one or more data storage media, devices, or configurations and may employ any type, form, and combination of computer-readable media. For example, the data storage facility 706 may include, but is not limited to, a hard drive, network drive, flash drive, magnetic disc, optical disc, random access memory ("RAM"), dynamic RAM ("DRAM"), other non-volatile and/or volatile storage unit, or a combination or sub-combination thereof. Data may be temporarily and/or permanently stored in the data storage facility 706.

I/O facility 708 may be configured to receive user input and provide user output and may include any hardware, firmware, software, or combination thereof supportive of input and output capabilities. For example, I/O facility 708 may include one or more devices for capturing user input, including, but not limited to, a microphone, keyboard or keypad, touch screen component, scanner, camera, and receiver (e.g., an RF or infrared receiver).

I/O facility 708 may include one or more components for presenting data for experiencing by a user 130, including, but not limited to, a graphics engine, a display, one or more display drivers, one or more audio speakers, and one or more audio drivers. Accordingly, I/O facility 708 may present data and/or other content (e.g., access records, application records, bills, billing program tools) for experiencing by the user 130.

Correlation facility 710 may be configured to correlate one or more records, including one or more access records and one or more application records, based on at least one correlation parameter. Correlation of records may include correlation facility 710 identifying records related to one another based on at least one shared correlation parameter and grouping the related records for processing as a group, such as in at least one billing operation (e.g., generating a bill for a data session and/or usage of one or more applications). In certain embodiments, correlation facility 710 may be configured to correlate records by automatically identifying a relationship between records based on at least one shared correlation parameter included in the records. This may include correlation facility 710 searching records for one or more correlation parameters. As an example, correlation facility 710 may identify an access record and an application record as including at least one shared correlation parameter (e.g., a data session correlation parameter and/or an application correlation parameter). The access record and application record may share the correlation parameter due to inter-layer liaison subsystem 306 acquiring and forwarding the correlation parameter across layers, and described above. Correlation facility 710 may group the identified records together. For example, correlation facility 710 may group the access record and the application record together for use in subsequent operations (e.g., for use in at least one billing operation).

Correlation subsystem 308 may be configured to perform one or more billing operations. For instance, correlation subsystem 308 may be configured to utilize correlated records, such as a correlated access record and application record, to generate a bill for access services and/or applications provided over network 106. As an example, correlation subsystem 308 may utilize a correlated access record and application record to generate a bill for a data session associated with the access record and usage of an application associated with the application record. A specific example of such a billing operation is described in more detail further below.

As shown in FIG. 7, access record data 412, application record data 512, and correlation parameter data 612 may be stored in storage facility 706 of correlation subsystem 308. Correlation subsystem 308 may acquire the access record data 412, application record data 512, and correlation parameter data 612 from access layer subsystem 302, application layer subsystem 304, and inter-layer liaison subsystem 306, respectively. Correlation subsystem 308 may use the access record data 412, application record data 512, and/or correlation parameter data 612 for one or more of the correlation and/or billing operations described herein. For example, correlation facility 710 may use correlation parameter data 612 to identify one or more correlation parameters to use to correlate access records and application records.

Figure 8:
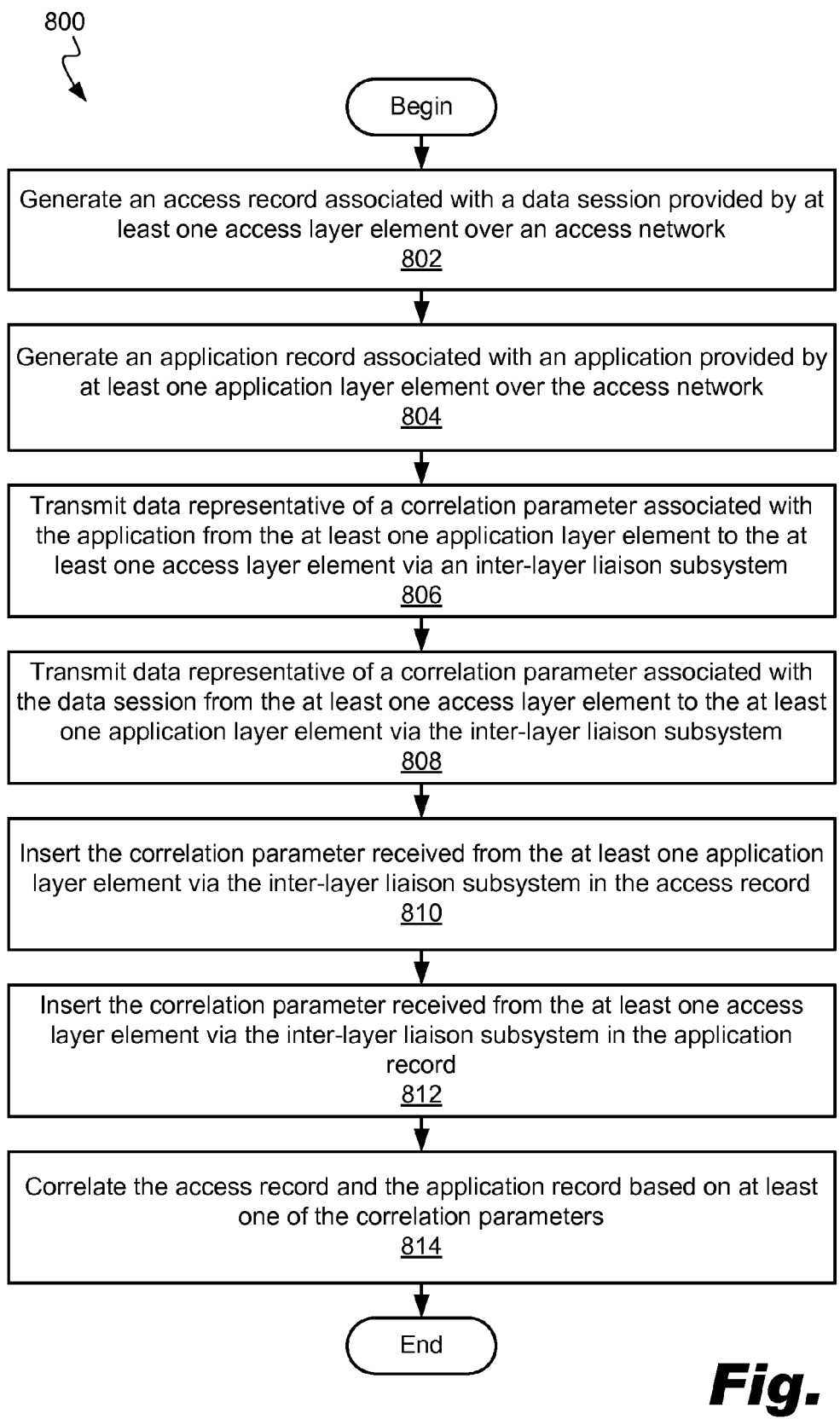
FIG. 8 illustrates an exemplary inter-layer parameter liaison method.

FIG. 8 illustrates an exemplary inter-layer liaison method 800. While FIG. 8 illustrates exemplary steps according to one embodiment, other embodiments may omit, add to, reorder, and/or modify any of the steps shown in FIG. 8. In certain embodiments, one or more of subsystems 302, 304, 306, and 308 may perform one or more of the steps shown in FIG. 8.

In step 802, an access record associated with a data session provided by at least one access layer element over an access network is generated. For example, access layer subsystem 302 may generate the access record for the data session (e.g., when access layer subsystem 302 establishes the data session over network 106).

In step 804, an application record associated with an application provided by at least one application layer element over the access network is generated. For example, application layer subsystem 304 may generate the application record for the application (e.g., when application layer subsystem 304 launches the application).

In step 806, data representative of a correlation parameter associated with the application is transmitted from the application layer element to the access layer element via an inter-layer liaison subsystem 306. For example, application layer subsystem 304 may transmit data representative of the application correlation parameter to inter-layer liaison subsystem 306, which may acquire and forward the application correlation parameter to access layer subsystem 302.

In step 808, data representative of a correlation parameter associated with the data session is transmitted from the access layer element to the application layer element via the inter-layer liaison subsystem 306. For example, access layer subsystem 302 may transmit data representative of the data session correlation parameter to inter-layer liaison subsystem 306, which may acquire and forward the application correlation parameter to access layer subsystem 302.

In step 810, the correlation parameter received from the application layer element via the inter-layer liaison subsystem is inserted in the access record. For example, access layer subsystem 302 may insert the received application correlation parameter in the access record (e.g., in a correlation parameter data field of the access record).

In step 812, the correlation parameter received from the access layer element via the inter-layer liaison subsystem is inserted in the application record. For example, application layer subsystem 304 may insert the received data session correlation parameter in the application record (e.g., in a correlation parameter data field of the application record).

In step 814, the access record and the application record are correlated based on at least one of the correlation parameters. For example, correlation subsystem 308 may correlate the access record and the application record as described above based on the shared data session correlation parameter and/or application parameter.

Figure 9:
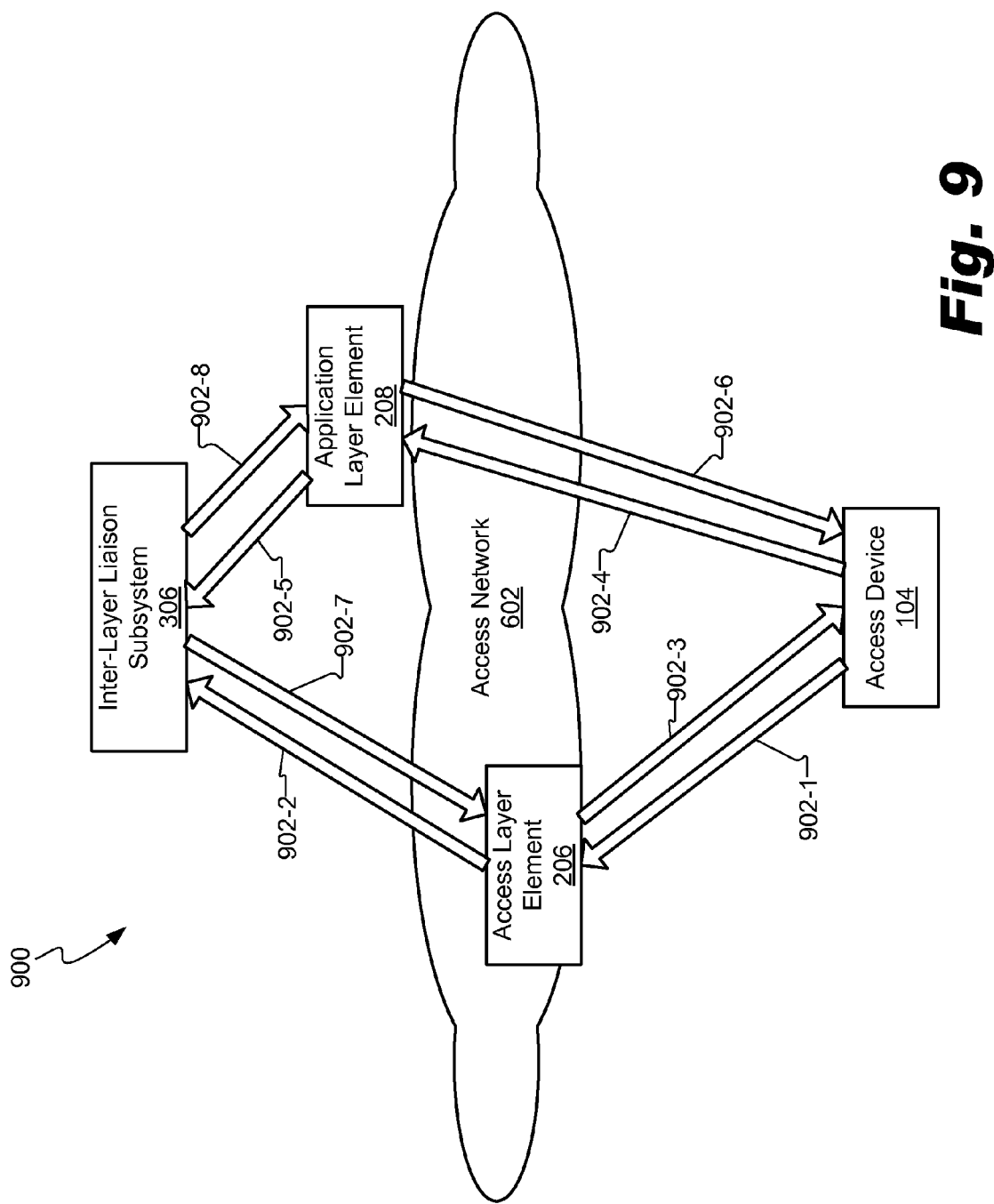
FIG. 9 illustrates an exemplary inter-layer parameter liaison data flow.

FIG. 9 illustrates an exemplary inter-layer parameter liaison data flow 900. Each arrow (e.g., arrows 902-1 through 902-8, collectively "arrows 902") shown in FIG. 9 is representative of a particular data flow. It will be recognized that the order in which illustrated data flows occur may be rearranged, added to, or otherwise modified as may serve a particular application. Moreover, it will be recognized that one or more of the data flows shown in FIG. 9 may be performed concurrently.

As represented by data flow 902-1, access device 104 may transmit data representative of a request to initiate a data session to access layer element 206. The request may be initiated in any manner as may serve a particular application. For example, the request may be initiated by powering on or enabling a network connection of access device 104 such that access device 104 connects to access network 602. The data session may include any of the exemplary data sessions described herein. For example, the data session may include an EVDO based communication session.

After the request to initiate a data session has been received by access layer element 206, access layer element 206 may create an access record associated with the data session. As described above, the access record may include, among other information, a correlation parameter associated with the data session (i.e., a data session correlation parameter). As represented by data flow 902-2, data representative of the data session correlation parameter may be transmitted from access layer element 206 to inter-layer liaison subsystem 306. Inter-layer liaison subsystem 306 may be configured to temporarily store the data session correlation parameter for subsequent distribution to one or more application layer elements 208, as will be described below.

In response to the request to initiate a data session, access layer element 206 may transmit data granting access to or otherwise associated with the data session to access device 104. This transmission of data is represented by data flow 902-3. Access device 104 may then utilize or otherwise access one or more data session functions.

During the data session, a user of access device 104 may desire to access an application provided by application layer element 208. For example, the user may desire to place a VoIP call, download a new ringtone or other data, and/or access one or more location-based services. To this end, access device 104 may transmit data representative of a request for the application to application layer element 208. This request is represented by data flow 902-4.

In response, application layer element 208 may create an application record associated with the application. As described above, the application record may include a correlation parameter associated with the application (i.e., an application correlation parameter). As represented by data flow 902-5, application layer element 208 may transmit data representative of the application correlation parameter to inter-layer liaison subsystem 306. Inter-layer liaison subsystem 306 may be configured to temporarily store the application correlation parameter for subsequent distribution to access layer element 206, as will be described below.

Application layer element 208 may be further configured to transmit data granting access to or otherwise associated with the application to access device 104. This transmission of data is represented by data flow 902-6. Access device 104 may then utilize or otherwise access the application.

In some examples, inter-layer liaison subsystem 306 may transmit data representative of the application correlation parameter to the access layer element 206, as represented by data flow 902-7. Likewise, inter-layer liaison subsystem 306 may transmit data representative of the data session correlation parameter to application layer element 208, as represented by data flow 902-8. In this manner, access layer element 206 may receive and insert the application correlation parameter in the access record. Likewise, application layer element 208 may receive and insert the data session correlation parameter in the application record.

Figure 10:
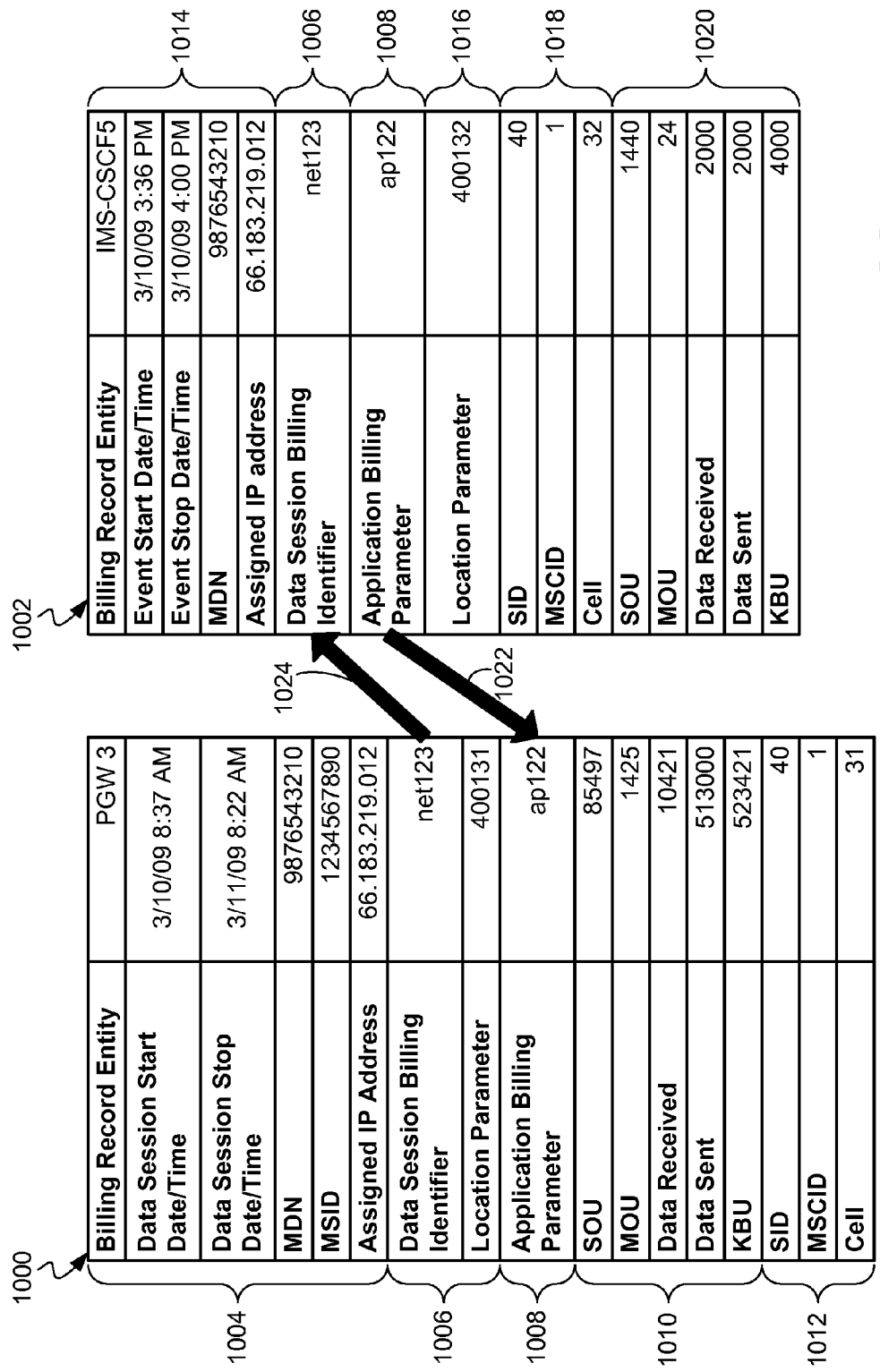
FIG. 10 illustrates an exemplary correlation of an access record and an application record.

In some examples, access layer element 206 and application layer element 208 may be configured to transmit the access record and the application record, respectively, to correlation subsystem 308. Correlation subsystem 308 may be configured to automatically identify the access record and the application record as including the correlation parameters and group the access record and the application record for processing as a group. FIG. 10 illustrates an exemplary access record 1000 and an exemplary application record 1002 and will be used to describe an exemplary correlation of the access record 1000 and the application record 1002.

Access record 1000 may include information associated with a particular data session. For illustrative purposes, the information shown in access record 1000 corresponds to a data session initiated by access device 104. Additional or alternative information associated with the data session may be included in access record 1000 as may serve a particular application.

As shown in FIG. 10, access record 1000 may include identification information 1004 associated with the data session. For example, access record 1000 may include a billing record entity number (e.g., "PGW 3") configured to identify the access record 1000 and/or an access layer element 206 that generated the access record 1000 for one or more billing purposes, a data session start date and time stamp (e.g., "3/10/09 8:37 AM"), a data session stop date and time stamp (e.g., "3/11/09 8:22 AM"), a mobile directory number ("MDN") (e.g., "9876543210") configured to identify a telephone number associated with the particular access device 104 used to initiate the data session, a mobile station identification number ("MSID") (e.g., "1234567890") configured to identify a mobile station used to initiate the data session, and an assigned IP address (e.g., "66.183.219.012") configured to identify an IP address of the access device 104 when the data session is initiated.

Access record 1000 may additionally or alternatively include one or more data session correlation parameters 1006 associated with the data session. For example, as shown in FIG. 10, access record 1000 may include a data session billing identifier (e.g., "net123") configured to identify the data session for one or more billing operations and a location parameter (e.g., "400131") configured to indicate a geographic location of the access device 104 when the data session is initiated.

Access record 1000 may additionally or alternatively include one or more application correlation parameters 1008 associated with one or more applications accessed by access device 104 during the data session. For example, access record 1000 may include an application billing parameter (e.g., "ap122") associated with an application accessed by access device 104. As described above, these application correlation parameters 1008 may be transmitted to access layer element 206 from application layer element 208 via inter-layer liaison subsystem 306 for insertion in access record 1000. In the example of FIG. 10, arrow 1022 illustrates that application billing parameter "ap122" has been transmitted to access layer element 206 via inter-layer liaison subsystem 306 and inserted in access record 1000.

Access record 1000 may additionally or alternatively include usage information 1010 associated with the data session. For example, access record 1000 may include a duration in seconds ("SOU") (e.g., "85497") of the data session, a duration in minutes ("MOU") (e.g., "1425"), an amount of data in kilobytes (e.g., "10421") received by access layer element 206 from access device 104 during the data session, an amount of data in kilobytes (e.g., "513000") sent by access layer element 206 to access device 104 during the data session, and a total number of kilobytes of data sent and received ("KBU") (e.g., "523421") during the data session.

Access record 1000 may additionally or alternatively include location information 1012 corresponding to a geographic location of access device 104 when the data session is initiated. Location data 1012 may be used to generate the location parameter described above and may include a system identification number ("SID") (e.g., "40") configured to identify a particular geographic market in which the access device 104 initiated the data session, a mobile switching center identification number ("MSCID") (e.g., "1") configured to identify the particular switch used within the market by access device 104 to initiate the data session, and a cell identification number (e.g., "31") configured to identify a particular cell site used by access device 104 to initiate the data session.

The information included within access record 1000 may be used by correlation subsystem 308 and/or any other component of provider subsystem 102 to track data usage and location-based information associated with the data session, perform one or more billing operations associated with the data session, and/or perform any other operation as may serve a particular application. For example, identification information 1004, correlation parameter information 1006 and 1008, usage information 1010, and/or location information 1012 may be compared to one or more limitations of a particular data access plan in order to appropriately bill a user for the data session.

Application record 1002 shown in FIG. 10 may include information associated with a particular application accessed by access device 104 during the data session associated with access record 1000. For illustrative purposes only, the information shown in application record 1002 corresponds to a VoIP application used by access device 104 to place a VoIP call during the data session associated with access record 1000. It will be recognized that application record 1002 may alternatively be associated with any other application as may serve a particular application and that it may include any additional or alternative information associated with the application as may serve a particular application.

The information included within application record 1002 may be used by correlation subsystem 308 and/or any other component of provider subsystem 102 to perform one or more billing operations associated with the accessed application, track data usage associated with the application, and/or perform any other operation as may serve a particular application.

As shown in FIG. 10, application record 1002 may include identification information 1014 associated with the accessed application. For example, application record 1002 may include a billing record entity number configured to identify the application record 1002 and/or an application layer element 208 that generated the application record 1002 for one or more billing purposes, an event start date and time stamp (e.g., "3/10/09 3:36 PM", which may be a start date and time of a VoIP call), an event stop date and time stamp (e.g., "3/10/09 4:00 PM", which may be a stop date and time of the VoIP call), a mobile directory number configured to identify a telephone number (e.g., "9876543210") associated with the particular access device 104 used to place the VoIP call, and an assigned IP address (e.g., "66.183.219.012") configured to identify an IP address of the access device 104 when the application is accessed.

Application record 1002 may additionally or alternatively include one or more of the data session correlation parameters 1006. As described above, these data session correlation parameters may be transmitted to application layer element 208 from access layer element 206 via inter-layer liaison subsystem 306 for insertion in application record 1002. In the example of FIG. 10, arrow 1024 illustrates that data session billing identifier "net123" has been transmitted to application layer element 208 via inter-layer liaison subsystem 306 and inserted in application record 1002.

Application record 1002 may additionally or alternatively include an application correlation parameter 1008 (e.g., application billing parameter "ap122"). Application correlation parameter 1008 may be generated by application layer element 208 as described above.

Application record 1002 may additionally or alternatively include a location parameter 1016 (e.g., "400132") configured to identify a geographic location of the access device 104 when the application is accessed and location information 1018. Location information 1018 may be used to generate location parameter 1016 and may include a SID (e.g., "40") configured to identify a particular geographic market in which the access device 104 accessed the application, a MSCID (e.g., "1") configured to identify the particular switch used within the market by access device 104 to access the application, and a cell identification number (e.g., "32") configured to identify a particular cell site used by access device 104 to access the application.

It will be recognized that application layer element 208 may not be capable of determining all or a part of location information 1018. Hence, in some examples, access layer element 206 may be configured to determine location information 1018 and location parameter 1016 and transmit this data to application layer element 208 via inter-layer liaison subsystem 306 as one or more data session correlation parameters.

Application record 1002 may additionally or alternatively include usage information 1020. For example, application record 1002 may include a duration in seconds (e.g., "1440") and minutes (e.g., "24") of how long the access device 104 utilizes the application (e.g., a duration of a VoIP call) and an amount of data (e.g., "4000") associated with the application that is received and transmitted while the application is used by access device 104.

As described above, one or more data session correlation parameters may be transmitted from an access layer element 206 to an application layer element 208 via inter-layer liaison subsystem 306 for insertion in application record 1002. For example, as illustrated by arrow 1004 in FIG. 10, an access network correlation parameter "net123" has been inserted in application record 1002.

In some examples, correlation subsystem 308 may be configured to automatically identify access record 1000 and application record 1002 as including shared correlation parameters 1006, 1008, and/or 1016 and group access record 1000 and application record 1002 for use in at least one correlation operation. For example, access record 1000 and application record 1002 may be grouped for use in a billing operation.

For example, correlation subsystem 308 may be configured to correlate access record 1000 and application record 1002 such that an accurate bill for the data session associated with access record 1000 and for usage of the application associated with application record 1002 is generated. To illustrate, a user may have a data access plan that charges the user a certain amount of money for each kilobyte of data transmitted during a data session associated with access record 1000. The user may be allowed to access an application associated with application record 1002 during the data session at a separate and/or additional cost.

However, data associated with the application may be transmitted between access device 104 and application layer element 208 via the data session when the application is accessed. To avoid double-billing the user, this data associated with the application should not be included in the amount of data transmitted during the data session for which the user will be billed. Hence, correlation subsystem 308 may be configured to subtract the transmitted data associated with the application from the total transmitted data associated with the data session and bill the user for the difference. In the example of FIG. 10, correlation subsystem 308 may be configured to subtract 4000 kilobytes from 523421 kilobytes and only bill the user for 519421 kilobytes of data usage under the data access plan. The usage of the application may be billed as a separate charge (e.g., a fixed monthly fee).

Correlation subsystem 308 may additionally or alternatively be configured to detect differences in the location information 1012 and 1018 included within access record 1000 and application record 1002, respectively, and to use the location information to generate an accurate bill for the data session and for usage of the application.

For example, a user may initiate the data session associated with access record 1000 at a particular location (e.g., San Francisco). While still within the data session, the user may move to a new location (e.g., Oakland) and access the application associated with application record 1002 at the new location. The new location may have different access fees, regulatory fees, taxes, and other costs associated with accessing the application than the original location. By detecting this change in location, correlation subsystem 308 may be configured to generate a bill for the accessed application based on the fees associated with the new location.

Figure 11:
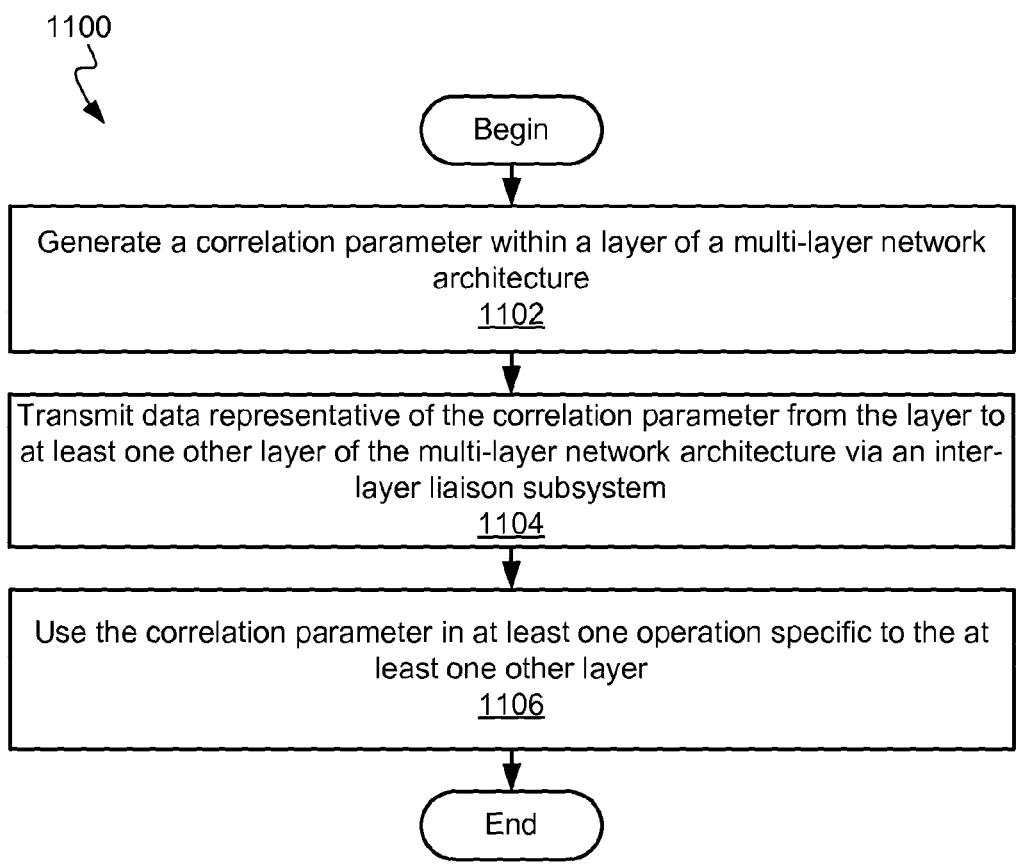
FIG. 11 illustrates another exemplary inter-layer parameter liaison method.

FIG. 11 illustrates another exemplary inter-layer liaison method 1100. While FIG. 11 illustrates exemplary steps according to one embodiment, other embodiments may omit, add to, reorder, and/or modify any of the steps shown in FIG. 11. In certain embodiments, one or more of subsystems 302, 304, 306, and 308 may perform one or more of the steps shown in FIG. 11.

In step 1102, a correlation parameter is generated within a layer of a multi-layer network architecture. The correlation parameter may be generated in any of the ways described herein. For example, the correlation parameter may be generated within access layer 202 or any other layer of a multi-layer network architecture.

In step 1104, data representative of the correlation parameter is transmitted from the layer to at least one other layer of the multi-layer network architecture via an inter-layer liaison subsystem. Data representative of the correlation parameter may be transmitted from the layer to at least one other layer via the inter-layer liaison subsystem in any of the ways described herein. As an example, data representative of the correlation parameter may be transmitted from access layer 202 to application layer 204. This illustrative only. The correlation parameter may be transmitted across any layers of a multi-layer network architecture.

In step 1106, the correlation parameter is used in at least one operation specific to the at least one other layer. The operation may include any of the operations described herein.

To illustrate, an access layer element 206 within access layer 202 may transmit a correlation parameter comprising a location parameter representative of a geographic location of access device 104 to an application layer element 208 within application layer 204 via inter-layer liaison subsystem 306. Application layer element 208 may be configured to perform one or more location-based operations in accordance with the location parameter. For example, application layer element 208 may include a coupon server or other real-time advertising server configured to automatically transmit local coupons or advertisements to access device 104. The coupons or advertisements may be location-specific and selected in accordance with the location parameter.

The operations described herein are merely illustrative of the many different operations that may utilize one or more correlation parameters. Additional or alternative operations may include, but are not limited to, fraud detection operations, troubleshooting operations, location-based emergency operations (e.g., E911 operations), access-device-specific operations, and/or any other operation specific to a particular layer as may serve a particular application.

In some examples, one or more of the exemplary systems or components thereof described herein may include or be implemented in any computing hardware and/or instructions (e.g., software programs), or combinations of computing instructions and hardware, configured to perform one or more of the processes described herein. In particular, it should be understood that the exemplary systems, or one or more components of the exemplary systems, may be implemented on one physical computing device or may be implemented on more than one physical computing device. Accordingly, the exemplary systems may include any one of a number of computing devices employing any of a number of computer operating systems.

One or more of the processes described herein may be implemented at least in part as computer-executable instructions, i.e., instructions executable by one or more computing devices, tangibly embodied in a computer-readable medium.

In general, a processor (e.g., a microprocessor) receives instructions, from a computer-readable medium (e.g., from a memory, etc.), and executes those instructions, thereby performing one or more processes, including one or more of the processes described herein. Such instructions may be stored and transmitted using a variety of known computer-readable media.

A computer-readable medium (also referred to as a processor-readable medium) includes any medium that participates in providing data (e.g., instructions) that may be read by a computer (e.g., by a processor of a computer). Such a medium may take many forms, including, but not limited to, non-volatile media and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computing device can read.

Accordingly, each of the components of the exemplary systems described herein may be implemented as hardware, computing instructions (e.g., software) tangibly embodied on a computer-readable medium, or a combination of hardware and tangibly embodied computing instructions configured to perform one or more of the processes described herein.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
generating an access record associated with a data session provided by at least one access layer element over an access network;
generating an application record associated with an application provided by at least one application layer element over the access network;
transmitting data representative of a correlation parameter associated with the application from the at least one application layer element to the at least one access layer element via an inter-layer liaison subsystem, the inter-layer liaison subsystem transmitting the data representative of the correlation parameter by bridging a functional disconnect across an application layer and an access layer; and
inserting the correlation parameter associated with the application and received from the at least one application layer element via the inter-layer liaison subsystem in the access record.

2. The method of claim 1, further comprising:
transmitting data representative of a correlation parameter associated with the data session from the at least one access layer element to the at least one application layer element via the inter-layer liaison subsystem; and inserting the correlation parameter associated with the data session and received from the at least one access layer element via the inter-layer liaison subsystem in the application record.

3. The method of claim 1, further comprising correlating the access record and the application record based on the correlation parameter associated with the application.

4. The method of claim 3, wherein the correlating of the access record and the application record based on the correlation parameter comprises:
automatically identifying the access record and the application record as including the correlation parameter associated with the application; and
grouping the access record and the application record for use in at least one billing operation.

5. The method of claim 3, further comprising utilizing the correlated access record and application record to generate a bill for the data session and usage of the application.

6. The method of claim 1, wherein the transmitting of data representative of the correlation parameter associated with the application from the at least one application layer element to the at least one access layer element via the inter-layer liaison subsystem comprises:
acquiring with the inter-layer liaison subsystem the data representative of the correlation parameter associated with the application from the at least one application layer element; and
transmitting with the inter-layer liaison subsystem data representative of the acquired correlation parameter associated with the application to the at least one access layer element.

7. The method of claim 1, wherein the transmitting of data representative of the correlation parameter associated with the application from the at least one application layer element to the at least one access layer element via the inter-layer liaison subsystem is performed in at least substantially real time.

8. The method of claim 1, tangibly embodied as computer-executable instructions on at least one computer-readable medium.

9. A method comprising:
generating an access record associated with a data session provided by at least one access layer element over an access network;
generating an application record associated with an application provided by at least one application layer element over the access network;
transmitting data representative of a correlation parameter associated with the data session from the at least one access layer element to the at least one application layer element via an inter-layer liaison subsystem, the inter-layer liaison subsystem transmitting the data representative of the correlation parameter by bridging a functional disconnect across an application layer and an access layer; and
inserting the correlation parameter associated with the data session and received from the at least one access layer element via the inter-layer liaison subsystem in the application record.

10. The method of claim 9, further comprising:
transmitting data representative of a correlation parameter associated with the application from the at least one application layer element to the at least one access layer element via an inter-layer liaison subsystem; and
inserting the correlation parameter associated with the application and received from the at least one application layer element via the inter-layer liaison subsystem in the access record.

11. The method of claim 9, further comprising correlating the access record and the application record based on the correlation parameter associated with the data session.

12. The method of claim 11, wherein the correlating of the access record and the application record based on the correlation parameter associated with the data session comprises:
automatically identifying the access record and the application record as including the correlation parameter associated with the data session; and
grouping the access record and the application record for use in at least one billing operation.

13. The method of claim 11, further comprising utilizing the correlated access record and application record to generate a bill for the data session and usage of the application.

14. The method of claim 9, wherein the transmitting of data representative of the correlation parameter associated with the data session from the at least one access layer element to the at least one application layer element via the inter-layer liaison subsystem comprises:
acquiring with the inter-layer liaison subsystem the data representative of the correlation parameter associated with the data session from the at least one access layer element; and
transmitting with the inter-layer liaison subsystem data representative of the acquired correlation parameter associated with the data session to the at least one application layer element.

15. The method of claim 9, wherein the transmitting of data representative of the correlation parameter associated with the data session from the at least one access layer element to the at least one application layer element via the inter-layer liaison subsystem is performed in at least substantially real time.

16. The method of claim 9, tangibly embodied as computer-executable instructions on at least one computer-readable medium.

17. A method comprising:
generating a correlation parameter within an application layer of a multi-layer network architecture;
transmitting data representative of the correlation parameter from the application layer to an access layer of the multi-layer network architecture via an inter-layer liaison subsystem, the inter-layer liaison subsystem transmitting the data representative of the correlation parameter by bridging a functional disconnect across the application layer and the access layer; and
using the correlation parameter in at least one operation specific to the access layer.

18. The method of claim 17, wherein the correlation parameter comprises a location parameter representative of a geographic location of an access device.

19. A system comprising:
an access layer subsystem configured to
provide a data session with an access device, and
generate an access record for the data session, the access record including a data session correlation parameter associated with the data session;
an application layer subsystem configured to
provide at least one application to the access device via the data session, and
generate an application record for the application, the application record including an application correlation parameter associated with the application;

an inter-layer liaison subsystem configured to communicate with the access layer subsystem and the application layer subsystem by bridging a functional disconnect across the application layer subsystem and the access layer subsystem and to acquire data representative of the application correlation parameter from the application layer subsystem, transmit data representative of the application correlation parameter acquired from the application layer subsystem to the access layer subsystem for insertion in the access record, acquire data representative of the data session correlation parameter from the access layer subsystem, and transmit data representative of the data session correlation parameter acquired from the access layer subsystem to the application layer subsystem for insertion in the application record; and a correlation subsystem configured to correlate the access record and the application record based on at least one of the application correlation parameter and the data session correlation parameter included in the access record and the application record.

20. The system of claim 19, wherein the application comprises at least one of a voice-communication service application, a voice-over-internet-protocol service application, a location-based service application, a ringtone application, a text-messaging service application, a media-messaging service application, an e-mail service application, and a chat service application, and a web-access service application.

21. The system of claim 19, wherein:
the application record comprises a billing record for usage of the application; and
the access record comprises a billing record for the data session.

22. The system of claim 21, wherein the correlation subsystem is further configured to utilize the correlated billing records to generate a bill based on data session throughput and usage of the application.

23. The system of claim 19, wherein the inter-layer liaison subsystem is implemented on one of an access layer element of an access layer and an application layer element of an application layer.

24. A system comprising:
at least one access layer element configured to provide a data session with an access device and to generate a data session billing record for the data session, the data session billing record including a data session billing identifier;

at least one application layer element configured to provide at least one application to the access device via the data session and to generate an application billing record for the application, the application billing record including an application billing identifier;

an inter-layer liaison subsystem configured to communicate with the at least one access layer element and the at least one application layer element by bridging a functional disconnect across an application layer and an access layer and to acquire the data session billing identifier from the at least one access layer element, transmit the data session billing identifier directly from the at least one access layer element to the at least one application layer element for insertion in the application billing record, acquire the application billing identifier from the at least one application layer element, and transmit the application billing identifier directly from the at least one application layer element to the at least one access layer element for insertion in the data session billing record.

25. The system of claim 24, further comprising a correlation subsystem configured to correlate the data session billing record and the application billing record based on at least one of the application billing identifier and the data session billing identifier included in the data session billing record and the application billing record.

* * * * *